(12) United States Patent
Kung

(10) Patent No.: US 11,991,434 B2
(45) Date of Patent: May 21, 2024

(54) MOBILE PHONE SINGLE-LENS LENS CONVERSION MECHANISM

(71) Applicant: Hsiang-Yun Kung, Nantou (TW)

(72) Inventor: Hsiang-Yun Kung, Nantou (TW)

( * ) Notice: Subject to any disclaimer, the term of this patent is extended or adjusted under 35 U.S.C. 154(b) by 0 days.

(21) Appl. No.: 17/889,579

(22) Filed: Aug. 17, 2022

(65) Prior Publication Data

US 2023/0053599 A1 Feb. 23, 2023

(30) Foreign Application Priority Data

Aug. 17, 2021 (TW) .................................. 110209697

(51) Int. Cl.
*H04N 23/55* (2023.01)
*H04N 23/57* (2023.01)

(52) U.S. Cl.
CPC ............. *H04N 23/55* (2023.01); *H04N 23/57* (2023.01)

(58) Field of Classification Search
CPC .................. H04N 23/55; H04N 23/57; H04N 2201/0096; H04N 2201/02431; H04N 2201/02439; H04N 2201/02466; H04N 23/52; G02B 7/14; G02B 13/001; G02B 13/002; G02B 13/003; G02B 13/004; G02B 13/005; G02B 13/006; G02B 13/007; G02B 13/008; G02B 13/009; A45C 11/38

See application file for complete search history.

(56) References Cited

U.S. PATENT DOCUMENTS 10,795,185 B1 * 10/2020 Sun .......................... F16B 1/00
2013/0163980 A1 * 6/2013 Lazaridis ............. G03B 17/565
396/529

\* cited by examiner

*Primary Examiner* — Jason A Flohre
(74) *Attorney, Agent, or Firm* — MUNCY, GEISSLER, OLDS & LOWE, P.C.

(57) ABSTRACT

Mobile phone single-lens lens conversion mechanism includes a positioning device and a lens device. The positioning device includes a main body that has a circular hole sleeved on a preset lens of a preset electronic device, sliding spaces concavely arranged around the circular hole and a positioning concave hole provided in each sliding space, and a magnet sealing iron shell arranged inside main body provided with iron sheet portions that fit the positioning concave holes. The lens device includes a holder shell, a set of lenses arranged in the holder shell corresponding to the preset lens, and a magnet sealing iron plate embedded in the holder shell. The magnet sealing iron plate has a circular hole for sleeving on preset lens, and is provided with a plurality of positioning magnets corresponding to the positioning concave holes. The lens device is assembled to the main body through the positioning magnets.

5 Claims, 8 Drawing Sheets

MOBILE PHONE SINGLE-LENS LENS CONVERSION MECHANISM

This application claims the priority benefit of Taiwan patent application number 110209697, filed on Aug. 17, 2021.

BACKGROUND OF THE INVENTION

1. Field of the Invention

The present invention provides a mobile phone single-lens lens conversion mechanism, in particular, a replaceable external lens is fixed to a preset electronic device by magnetic adsorption, and cooperates with positioning slideways on it and the combination of an external lens, wherein the magnetic force of the positioning magnets is blocked by a magnet sealing iron shell and a magnet sealing iron plate, which greatly reduces the doubts about the influence of the magnetic field on the electronic device, and also reduces the weight and size of the lens, which is convenient for users to carry and store.

2. Description of the Related Art

With the development of 3C products today, taking mobile phones as an example, the functions they have are no longer just calling and surfing the Internet.

Among them, the function of the camera is one of the most commonly used functions, such as taking pictures, selfie, video recording, etc. When the early mobile phone only had a single lens, a high-magnification magnification effect was achieved by clipping or pasting an external lens. Today's mobile phones achieve this purpose through three lenses and four lenses.

However, the existing plug-in lens is not only too large in size and weight, but also is cumbersome in the process of lens installation and adjustment. In order to meet the needs of optical axis alignment, it must be continuously adjusted without professional background and expertise. The three-lens and four-lens mobile phones do not have this problem, but the unit price is much higher. These deficiencies are the key to the research and improvement that those engaged in this industry are eager to study and improve.

SUMMARY OF THE INVENTION

The present invention has been accomplished under the circumstances in view. It is therefore the main object of the present invention to provide a mobile phone single-lens lens conversion mechanism, which enables a mobile phone to directly replace the lens like a traditional single-lens camera. The mechanism comprises a positioning device and a lens device. The positioning device is designed on the outside of the mobile phone and comprises a main body and a magnet sealing iron shell embedded in the main body. A circular hole runs through the middle of the two. The space in the circular hole is used to assemble various lenses or only a photosensitive chip. The upper side of the main body has a plurality of symmetrical sliding spaces, each sliding space has a positioning concave hole and a positioning slideway, which are designed to facilitate the release of magnetic force or magnetic adsorption. The lens device is composed of a holder shell, a magnet sealing iron plate embedded in the holder shell, and positioning magnets partially embedded in the holder shell. A circular hole is also penetrated between the three. The space in the circular hole is also used to assemble various lenses. The positions of the positioning magnets precisely correspond to the positioning concave holes. When the positioning magnets are turned into the positioning concave holes from the positioning slideways, the combination of the positioning device and the lens device is completed, and the design concept of disassembly can be achieved without the need for professional technology of optical axis alignment. When the combination is completed, the positioning magnets are sandwiched by the magnet sealing iron shell and the magnet sealing iron plate, and the magnetic lines of force will not leak out, which can greatly reduce the doubts about the influence of the magnetic field on the electronic device. In addition, it can also reduce the weight and size of the lens, which is convenient for users to carry and store.

It is another object of the present invention to provide a mobile phone single-lens lens conversion mechanism, wherein the magnet sealing iron shell is embedded in the main body by insert molding, and the magnet sealing iron plate is embedded in the holder shell by insert molding.

It is still another object of the present invention to provide a mobile phone single-lens lens conversion mechanism, wherein each sliding space has a positioning slideway inclined inward to facilitate the positioning and detachment of the main body of the lens device.

It is still another object of the present invention to provide a mobile phone single-lens lens conversion mechanism, wherein the positioning magnets are adsorbed between the iron sheet portions of the magnet sealing iron shell and the magnet sealing iron plate through a symmetrical arrangement of N poles and S poles alternately, so that the magnetic lines of force are maximally sealed between the positioning device and the lens device in order to strengthen the adsorption force of the lens device.

It is still another object of the present invention to provide a mobile phone single-lens lens conversion mechanism, wherein through the direct combination of the positioning device and the lens device, the weight and size of the lens can be reduced to achieve the effect of being convenient for users to carry and store.

It is still another object of the present invention to provide a mobile phone single-lens lens conversion mechanism, wherein the symmetrical positioning magnets are embedded in the holder shell of the lens device together with the magnet sealing iron plate through the plastic injection method. The difference from the magnet sealing iron plate is that the positioning magnets are partially exposed, not completely covered.

It is still another object of the present invention to provide a mobile phone single-lens lens conversion mechanism, which simplifies the positioning device mechanism, and designs an external lens storage box using color management.

DETAILED DESCRIPTION OF THE PREFERRED EMBODIMENT

Figure 1:
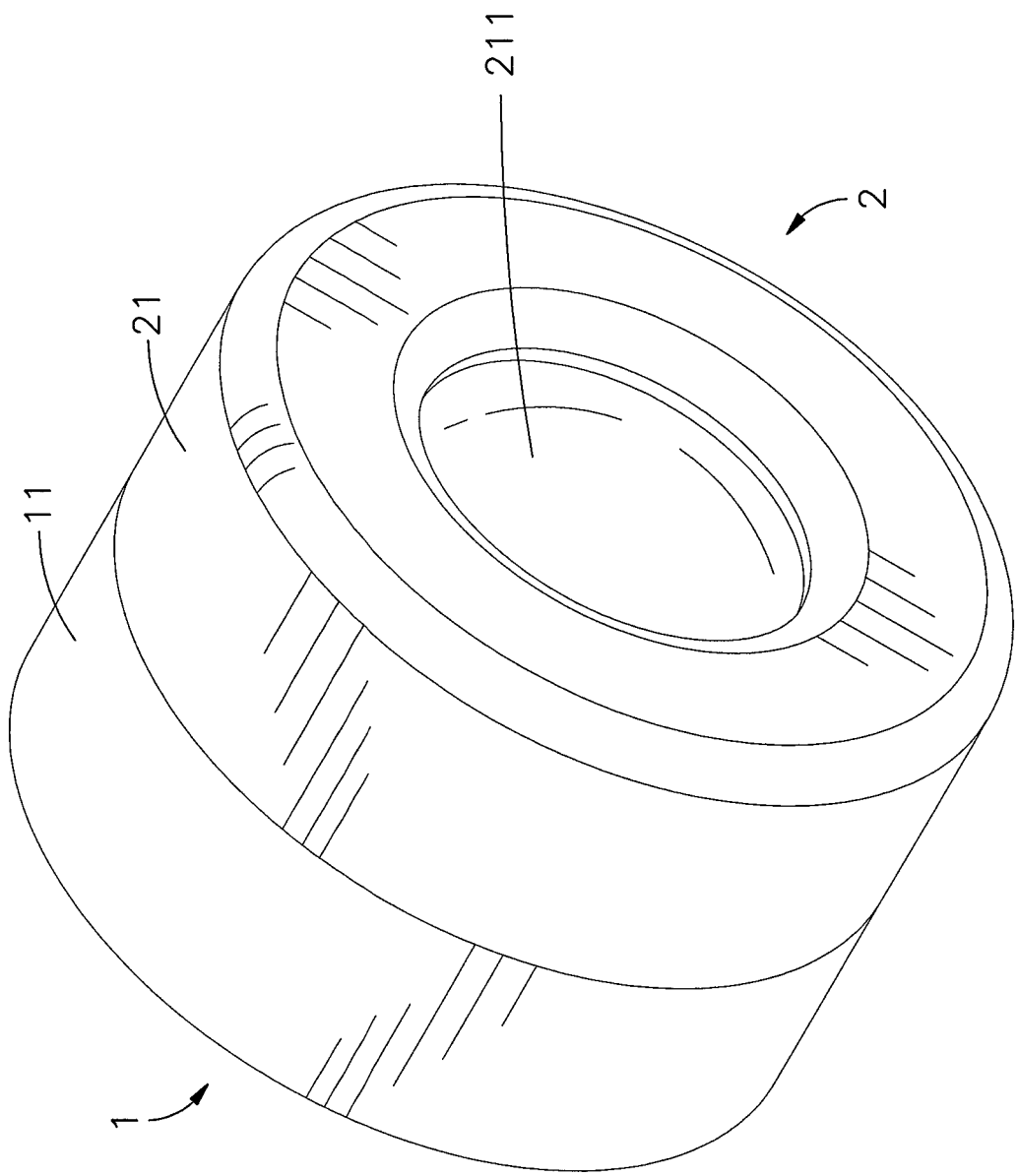
FIG. 1 is a three-dimensional appearance view of the mobile phone single-lens lens conversion mechanism of the present invention.
Figure 2:
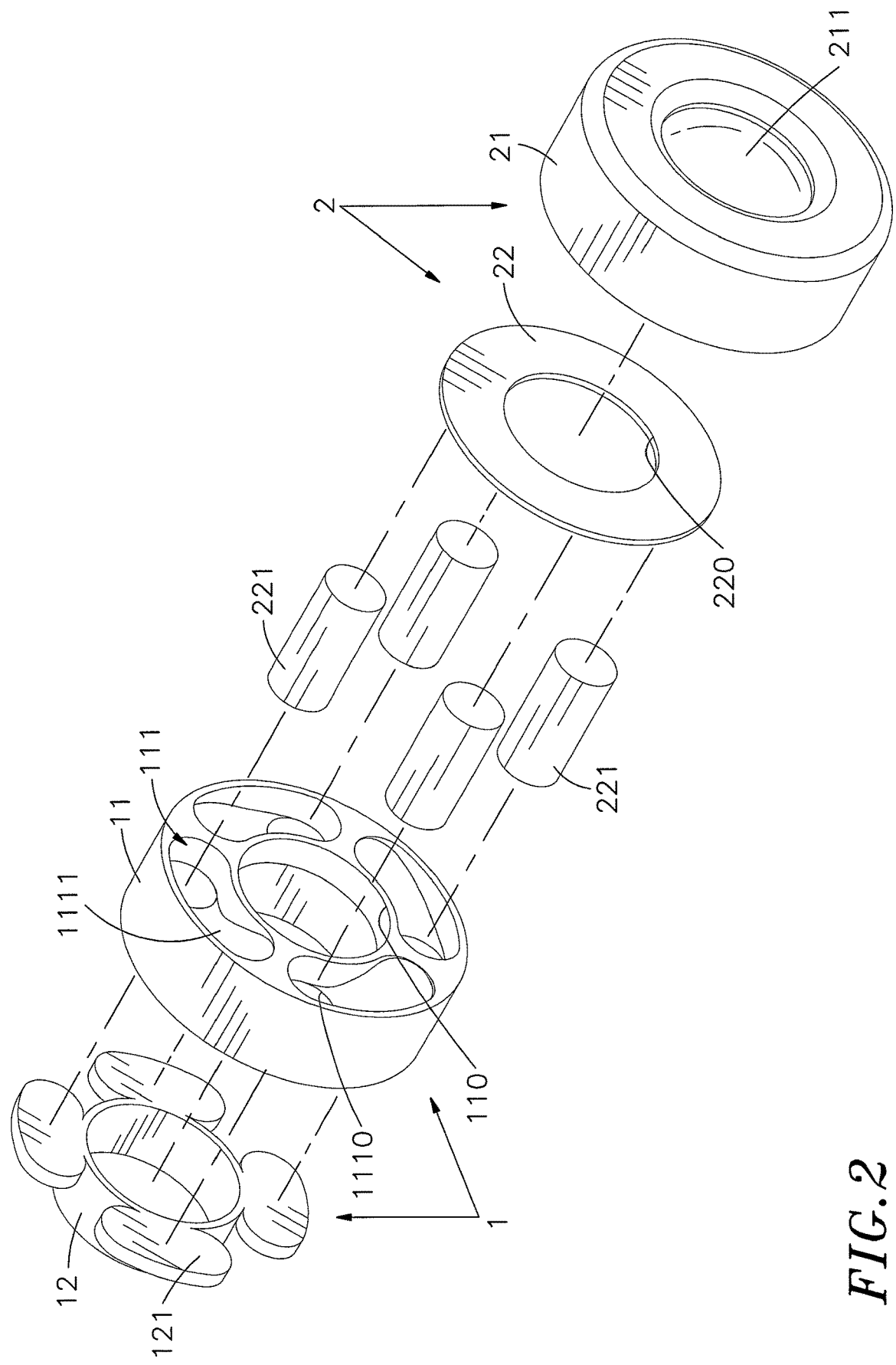
FIG. 2 is an exploded view of the mobile phone single-lens lens conversion mechanism of the present invention.
Figure 3:
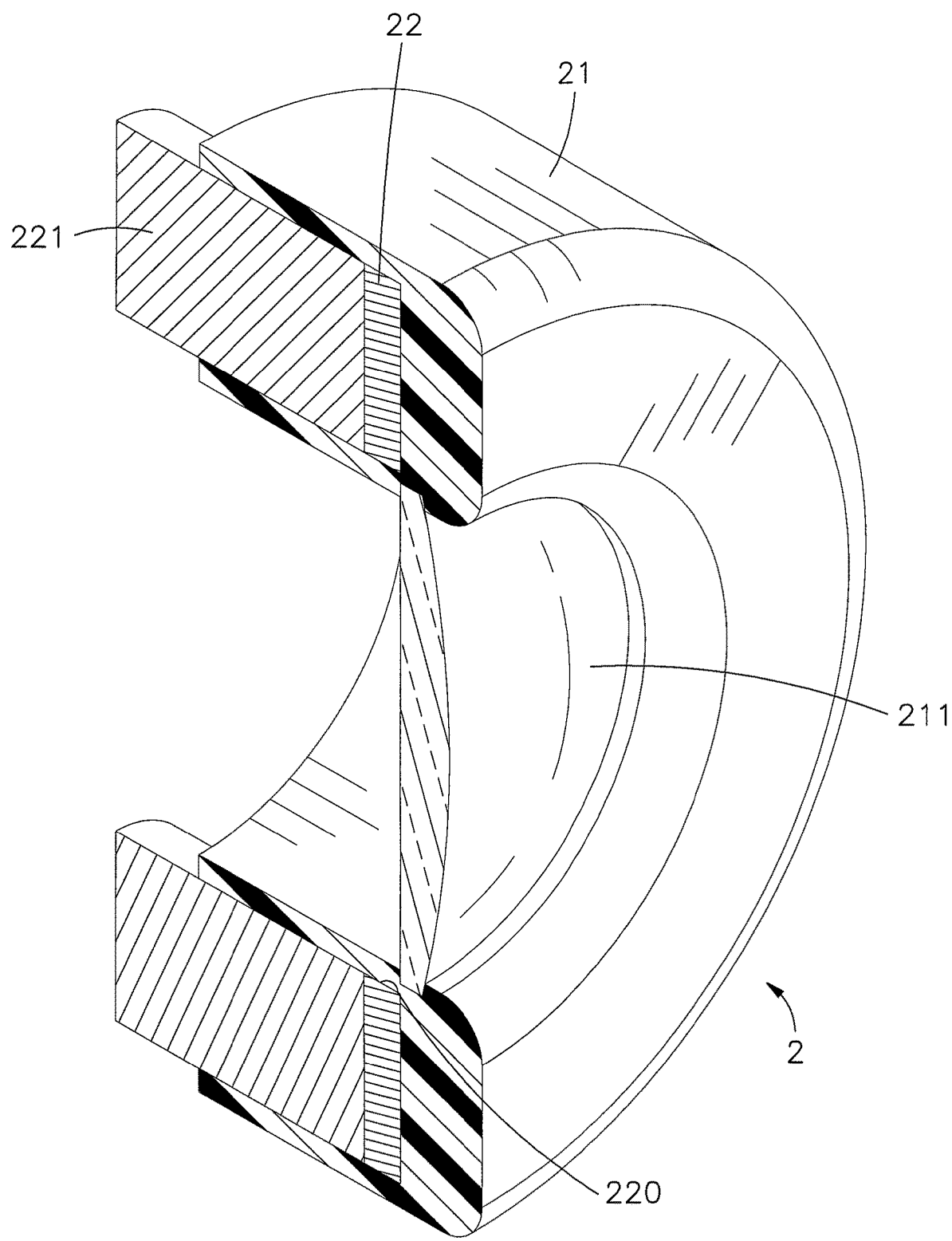
FIG. 3 is a side sectional view of the lens device of the mobile phone single-lens lens conversion mechanism of the present invention.

Please refer to FIGS. 1 to 4. The mobile phone single-lens lens conversion mechanism of the present invention mainly comprises a positioning device 1 and a lens device 2, and the connection relationship of the aforementioned devices is as follows:

The positioning device 1 is set on a preset lens 31 of a preset electronic device (such as a mobile phone) 3. The positioning device 1 comprises a main body 11 and a magnet sealing iron shell 12. The main body 11 has a circular hole 110 sleeved on the preset lens 31, a plurality of sliding spaces 111 concavely arranged around the circular hole 110, and a positioning concave hole 1110 respectively provided in each sliding space 111. The magnet sealing iron shell 12 is arranged inside the main body 11, and the magnet sealing iron shell 12 is provided with a plurality of iron sheet portions 121 that fit the positioning concave holes 1110 around the magnet sealing iron shell 12, and the centers of the iron sheet portions 121 and the corresponding positioning concave holes 1110 are aligned.

The lens device 2 comprises a holder shell 21, a set of lenses 211 arranged in the holder shell 21 corresponding to the preset lens 31 (the lenses shown in the figure is for illustration only), a magnet sealing iron plate 22 provided at an inner side of the holder shell 21 that has a circular hole 220 on which the preset lens 31 can be sleeved. The magnet sealing iron plate 22 is provided with a plurality of positioning magnets 221 corresponding to the positioning concave holes 1110, and the lens device 2 is assembled to the main body 11 through the positioning magnets 221.

Each of the sliding spaces 111 has a positioning slideway 1111 inclined inward to facilitate the positioning and disengagement of the holder shell 21.

Figure 7:
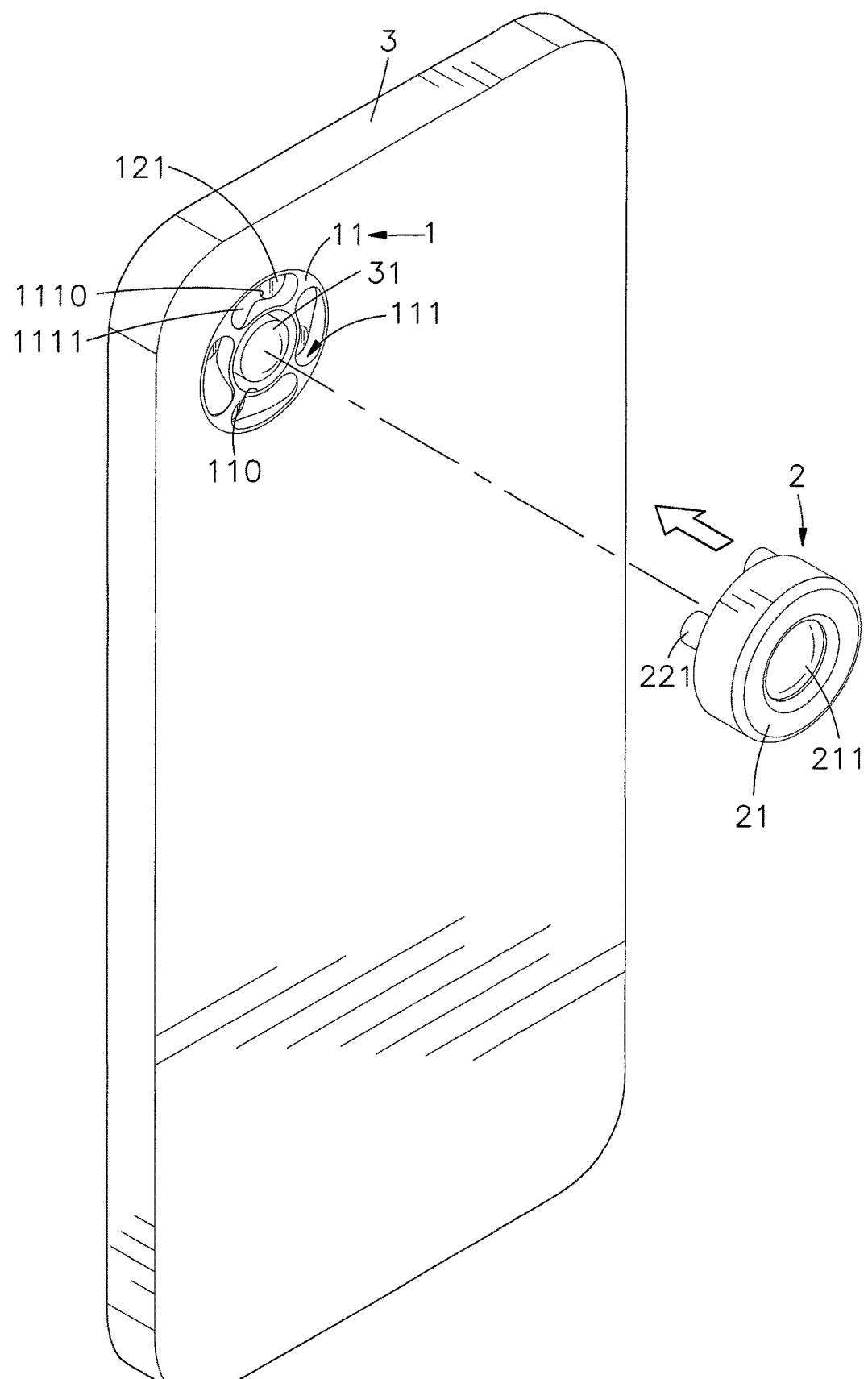
FIG. 7 is a schematic exploded view, showing an application example of the present invention before installation of the mobile phone single-lens lens conversion mechanism in the electronic device.

In order to assemble the mobile phone single-lens lens conversion mechanism of the present invention, firstly, the magnet sealing iron shell 12 is assembled inside the main body 11 of the positioning device 1 by insert molding, and the positioning device 1 is installed on the preset lens 31 of the preset electronic device 3, so that the preset lens 31 is accommodated inside the circular hole 110, then install the lens device 2 to be installed on the preset electronic device 3 on the preset lens 31. The lens device 2 uses a mechanical arm to clamp a plurality of symmetrical positioning magnets 221 with N poles and S poles alternately arranged, and after adsorbing the magnet sealing iron plate 22, the magnet sealing iron plate 22 is completely encapsulated in the holder shell 21, and the positioning magnets 221 are partially encapsulated in the holder shell 21 by means of insert molding. There is a circular hole 220 in the formed holder shell 21, and the inner space is used to install various lenses 211 (the drawing is only for illustration). The positions of the positioning magnets 221 need to be precisely matched with the positioning concave holes 1110 on the positioning device, so that the lens device 2 can be inserted into the sliding spaces 111 on the main body 11 of the positioning device 1 through the positioning magnets 221. The positioning magnets 221 are made to slide inward along the positioning slideways 1111 inside the sliding spaces 111 to the positioning concave holes 1110, and the positioning magnets 221 are made to adsorb the iron sheet portions 121 fixed on the outer edges of the positioning concave holes 1110 to complete the assembly of the mobile phone single-lens lens conversion mechanism of the present invention (as shown in FIG. 7).

Figure 4:
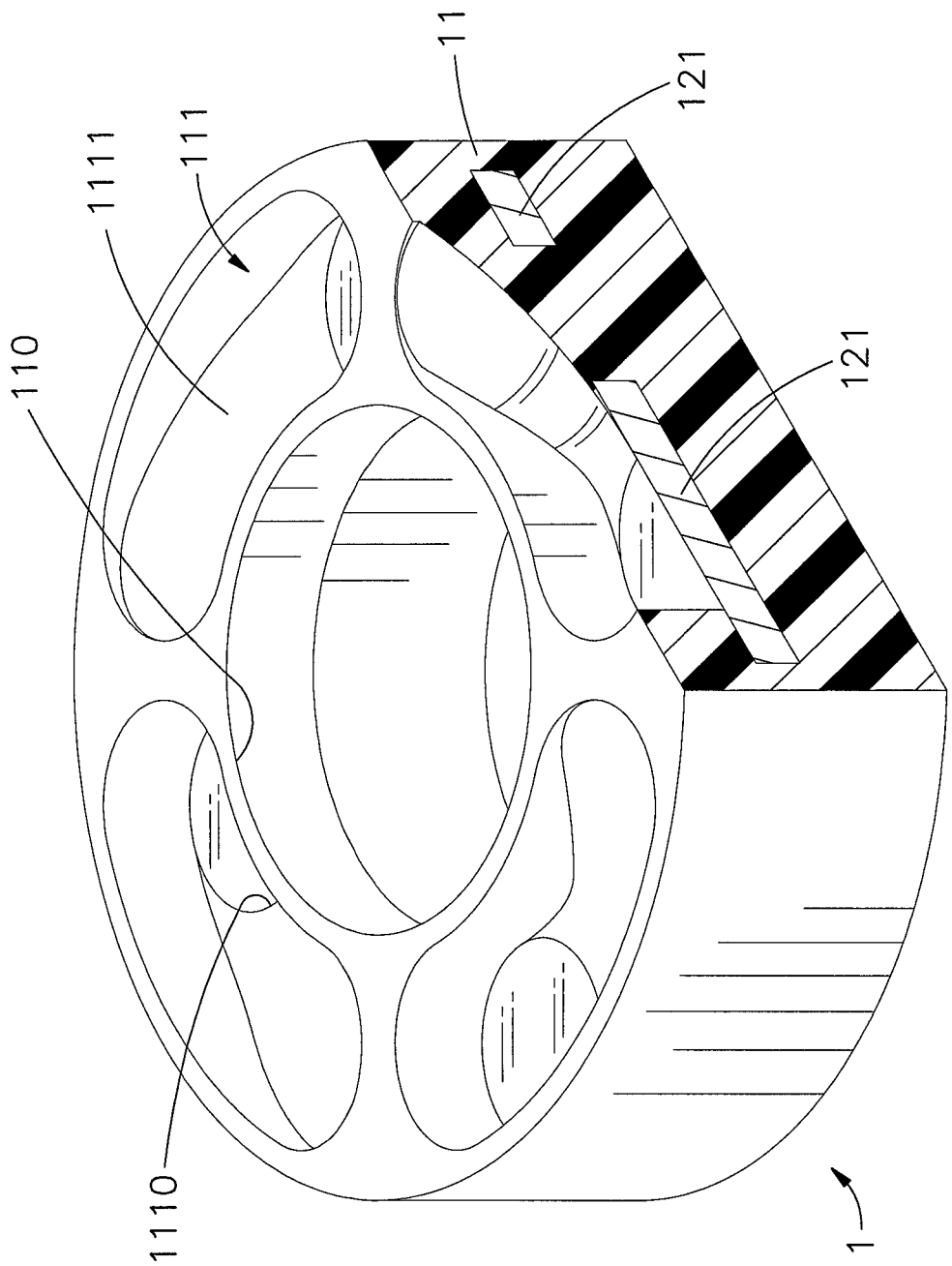
FIG. 4 is a side sectional view of the positioning device of the mobile phone single-lens lens conversion mechanism of the present invention.
Figure 5:
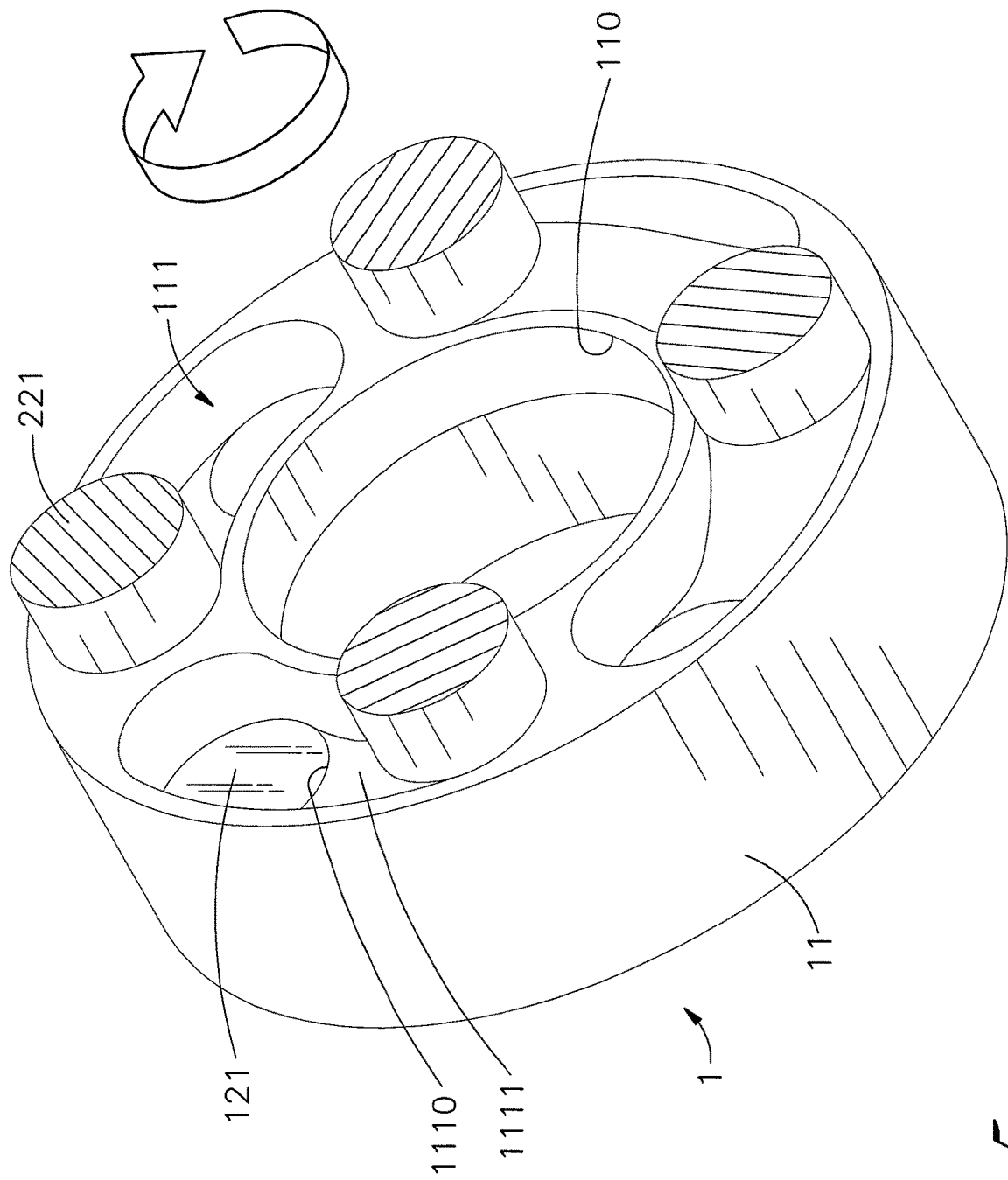
FIG. 5 is a schematic diagram of the mobile phone single-lens lens conversion mechanism intercepting the positioning magnets on the lens device before sliding according to the present invention.
Figure 6:
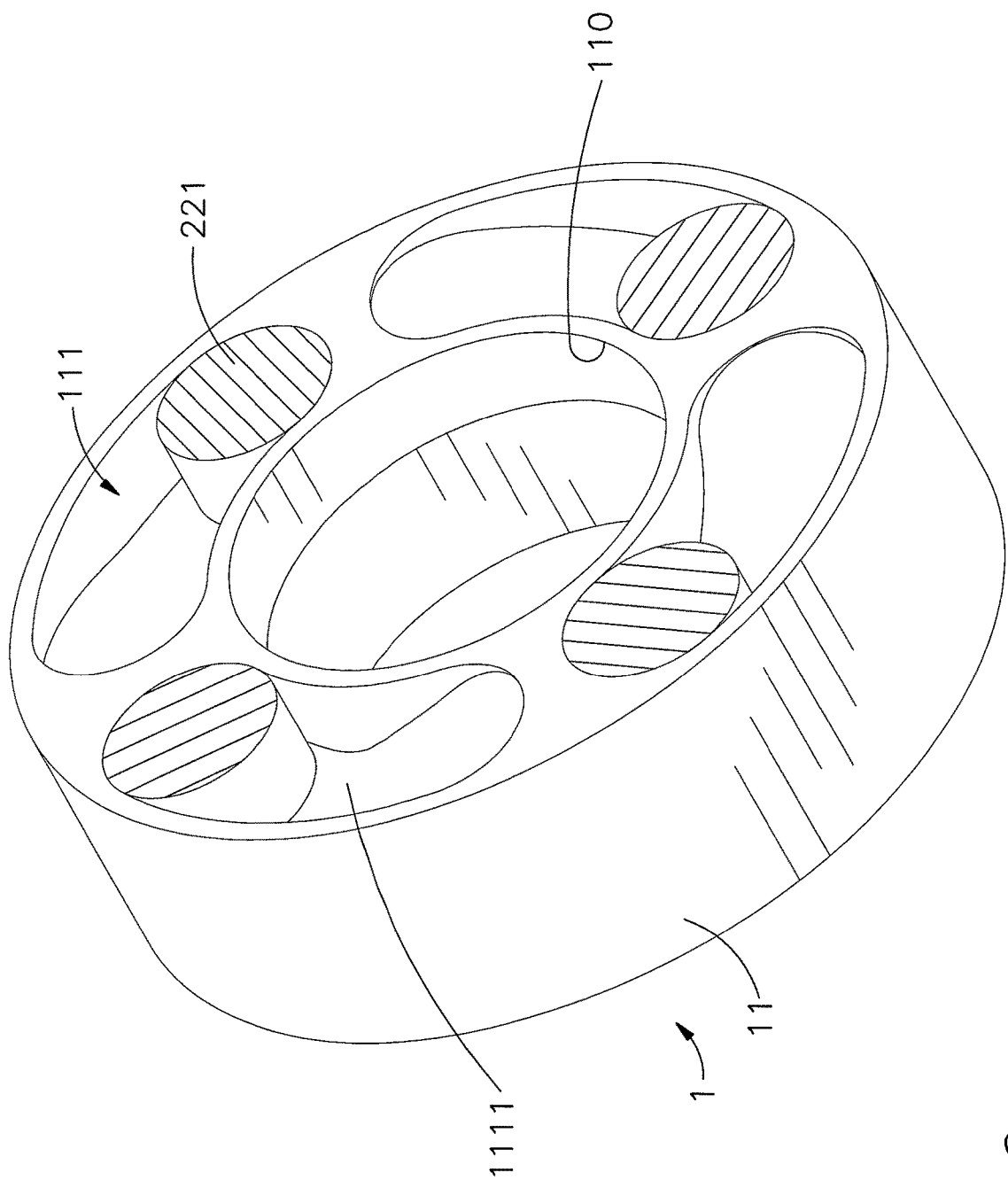
FIG. 6 is a schematic diagram of the mobile phone single-lens lens conversion mechanism intercepting the positioning magnets on the lens device after sliding according to the present invention.

When the present invention is applied in practice, please refer to the diagrams shown in FIGS. 4 and 5. The positioning magnets 221 on the lens device 2 are placed above the positioning slideways 1111 on the surface of the main body 11 of the positioning device 1, and slide clockwise and inward to the positioning concave holes 1110, and are adsorbed and fixed to the corresponding positioning iron sheet portions 121 at the bottom of the positioning concave holes 1110 to complete the combination. Since the positioning magnets 221 are arranged in an alternate arrangement of N poles and S poles, after the combination, the positioning magnets 221 are sandwiched between the magnet sealing iron shell 12 and the magnet sealing iron plate 22, so that the magnetic field lines of the positioning magnets 221 are maximally and sealed in the magnet sealing iron shell 12 and the magnet sealing iron plate 22, which can also enhance the adsorption force of the external lens and reduce the influence of the magnetic field on the electronic device. If you want to replace another external lens, you only need to rotate the lens device 2 counterclockwise to horizontally cut off the magnetic adsorption between the positioning magnets 221 and the magnet sealing iron shell 12, so that the positioning magnets 221 can be easily slid out along the positioning slideways 1111 to avoid the strong magnetic force required to forcibly remove the lens device 2, which will cause damage to the positioning device 1 and/or the lens device 2.

Figure 8:
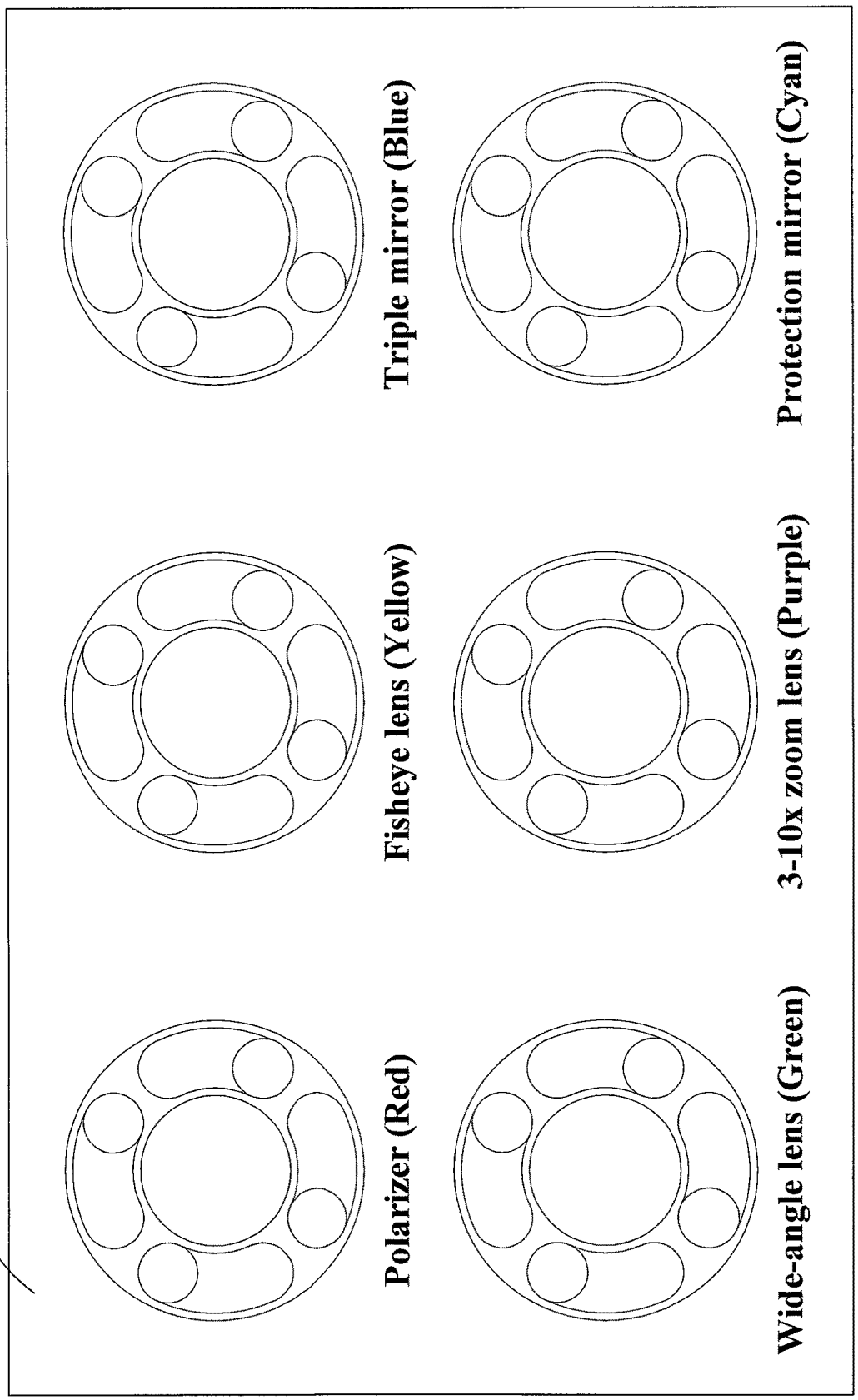
FIG. 8 is a schematic diagram of the mobile phone single-lens lens conversion mechanism external lens storage box of the present invention.

Referring to FIG. 8, it can be clearly seen from the figure that the storage structure is similar to the positioning device, the only difference is that the magnet sealing iron shell 12 is replaced by the magnet sealing iron plate 22, and the rest of the structure such as sliding spaces are all the same as the positioning device. In the storage box 4 shown in the figure, different colors are used to distinguish the properties of the external lenses stored, such as red storages a polarizer, yellow storages a fisheye lens, blue storages a triple mirror, green storages a wide-angle lens, and purple storages a 3-10× zoom lens and cyan storages a protection mirror. The corresponding external lens will also have the same color marking to facilitate users to distinguish, store and organize. The use of the present invention does not require the professional knowledge of the quasi-optical axis, but only needs to replace the lens like a traditional single-lens camera, directly insert it and turn it to position, and the weight and size of the lens are greatly reduced, so as to facilitate the user to carry and store.

The present invention is to provide an inventive mechanism that can directly replace the lens of a mobile phone, so that the camera of the mobile phone has the function of replacing the lens of a traditional single-lens camera. The mechanism comprises a positioning device and a lens device.

(1) The positioning device is designed on the outside of the mobile phone and comprises a main body and a magnet sealing iron shell embedded in the main body. A circular hole runs through the middle of the two. The space in the circular hole is used to assemble various lenses or only a photosensitive chip. The upper side of the main body has a plurality of symmetrical sliding spaces, each sliding space has a positioning concave hole and a positioning slideway, which are designed to facilitate the release of magnetic force or magnetic adsorption.

(2) The lens device is composed of a holder shell, a magnet sealing iron plate embedded in the holder shell, and positioning magnets partially embedded in the holder shell. A circular hole is also penetrated between the three. The space in the circular hole is also used to assemble various lenses. The positions of the positioning magnets precisely correspond to the positioning concave holes. When the positioning magnets are turned into the positioning concave holes from the positioning slideways, the combination of the positioning device and the lens device is completed, and the design concept of disassembly can be achieved without the need for professional technology of optical axis alignment. When the combination is completed, the positioning magnets are sandwiched by the magnet sealing iron shell and the magnet sealing iron plate, and the magnetic lines of force will not leak out, which can greatly reduce the doubts about the influence of the magnetic field on the electronic device. In addition, it can also reduce the weight and size of the lens, which is convenient for users to carry and store.

What the invention claimed is:

1. A mobile phone single-lens lens conversion mechanism, comprising a positioning device, wherein said positioning device comprises a magnetic adsorption structure directly constructed on a mobile phone lens and a lens device, and combines said mobile phone lens and said lens device with magnetic direct adsorption, wherein said positioning device comprises a plurality of positioning slideways with circular arc design, so that when said lens device rotates along said positioning slideways, arcs of multiple positioning magnets on said lens device are attached to said positioning slideways up and down, making said lens device to locate and disengage to reduce wear of said positioning slideways, wherein said positioning magnets are symmetrical, and are designed with an adsorption mechanism in which N poles and S poles are staggered, which maximally seal magnetic lines of force in a magnet sealing iron shell provided in said positioning device and a magnet sealing iron plate in said lens device to strengthen an adsorption force of said lens device and also reduce influence of magnetic field on an electronic device.

2. A mobile phone single-lens lens conversion mechanism, comprising:

a positioning device set on a preset lens of a preset electronic device, said positioning device comprising a main body and a magnet sealing iron shell, said main body comprising a circular hole sleeved on said preset lens, a plurality of sliding spaces concavely arranged around said circular hole and a positioning concave hole respectively provided in each said sliding space, said magnet sealing iron shell being arranged inside said main body, said magnet sealing iron shell being provided with a plurality of iron sheet portions that fit said positioning concave holes around said magnet sealing iron shell, the centers of said iron sheet portions and said corresponding positioning concave holes being aligned; and a lens device comprising a holder shell, a set of lenses arranged in said holder shell corresponding to said preset lens and a magnet sealing iron plate provided at an inner side of said holder shell, said magnet sealing iron plate having a circular hole for sleeving on said preset lens, said magnet sealing iron plate being provided with a plurality of positioning magnets corresponding to said positioning concave holes, said lens device being assembled to said main body through said positioning magnets.

3. The mobile phone single-lens lens conversion mechanism as claimed in claim 2, wherein each said sliding space has a positioning slideway inclined inward to facilitate the positioning and detachment of said holder shell of said lens device.

4. The mobile phone single-lens lens conversion mechanism as claimed in claim 2, wherein said positioning magnets are adsorbed on said iron sheet portion through a symmetrical arrangement of N poles and S poles alternately, and the magnetic lines of force are maximally sealed in said main body to strengthen the adsorption force of said lens device.

5. The mobile phone single-lens lens conversion mechanism as claimed in claim 2, wherein a thin layer of plastic in each said positioning concave hole to avoid affecting the magnetic adsorption, or the respective said iron sheet portion is directly exposed.

* * * * *